(12) United States Patent
Chang et al.

(10) Patent No.: US 9,991,508 B2
(45) Date of Patent: Jun. 5, 2018

(54) CHEMICAL SYNTHESIS ROUTE FOR LITHIUM ION BATTERY APPLICATIONS

(71) Applicant: Changs Ascending Enterprise Co., Ltd., Situn District, Taichung (TW)

(72) Inventors: Chun-Chieh Chang, Ithaca, NY (US); Tsun Yu Chang, Taichung (TW)

(73) Assignee: CHANGS ASCENDING ENTERPRISE CO., LTD, Situn District, Taichung (TW)

( * ) Notice: Subject to any disclaimer, the term of this patent is extended or adjusted under 35 U.S.C. 154(b) by 285 days.

(21) Appl. No.: 14/801,011

(22) Filed: Jul. 16, 2015

(65) Prior Publication Data

US 2015/0325845 A1 Nov. 12, 2015

Related U.S. Application Data

(62) Division of application No. 13/865,963, filed on Apr. 18, 2013, now Pat. No. 9,105,919.

(51) Int. Cl.
| | |
|---|---|
| *C01D 15/00* | (2006.01) |
| *H01M 4/50* | (2010.01) |
| *C22B 47/00* | (2006.01) |
| *H01M 4/505* | (2010.01) |
| *H01M 4/36* | (2006.01) |
| *C22B 26/12* | (2006.01) |
| *H01M 4/131* | (2010.01) |
| *H01M 4/136* | (2010.01) |
| *H01M 4/04* | (2006.01) |
| *H01M 4/58* | (2010.01) |

(52) U.S. Cl.
CPC ............ *H01M 4/364* (2013.01); *C01D 15/00* (2013.01); *C22B 26/12* (2013.01); *C22B 47/0054* (2013.01); *C22B 47/0063* (2013.01); *H01M 4/0471* (2013.01); *H01M 4/131* (2013.01); *H01M 4/136* (2013.01); *H01M 4/50* (2013.01); *H01M 4/505* (2013.01); *H01M 4/5825* (2013.01); *Y02E 60/122* (2013.01)

(58) Field of Classification Search
CPC combination set(s) only.
See application file for complete search history.

(56) References Cited

U.S. PATENT DOCUMENTS 8,784,694 B2 * 7/2014 Kay ............... C01B 25/375
                                                                                252/506
2006/0222946 A1  10/2006  Okada et al.
2014/0312267 A1  10/2014  Chang et al.

FOREIGN PATENT DOCUMENTS

| CN | 101538655 A | * | 9/2009 |
|---|---|---|---|
| CN | 103022485 A | | 4/2013 |
| JP | 2005123024 A | | 5/2005 |
| RU | 2444815 C1 | | 3/2012 |

OTHER PUBLICATIONS

CN-101538655 machine translation.*
Jungwon Kang, et al., "A High Voltage LiMnP04—LiMn2O4 Nanocomposite Cathode Synthesized by a One-Pot Pyro Synthesis for Li-ion Batteries", RSC Advances, val. 3, No. 48, Oct. 21, 2013, p. 25640.
Jiang Q L, et al., "Synthesis and Characterization of Phosphate-Modified LiMn2O4 Cathode Materials for Li-ion Battery", Chinese Chemical Letters, Elsevier Ltd., GB, val. 21, No. 11, Sep. 15, 2010, pp. 1382-1386.
International Search Report and Written Opinion of the International Searching Authority for PCTIIB2014/001066 dated May 4, 2015.
English translation of the Abstract for JP 2005 123024 published on May 12, 2005.
English translation of the Abstract for CN 103022485 published on Apr. 3, 2013.
Russian Office Action for application No. RU 2017105509 dated Nov. 10, 2017.
Taiwan Office Action for 103113053 dated Oct. 20, 2017.

* cited by examiner

*Primary Examiner* — Haidung D Nguyen
(74) *Attorney, Agent, or Firm* — Thomas | Horstemeyer, LLP

(57) ABSTRACT

An exemplary embodiment of a synthesis method includes the following acts or steps: providing $LiMn_2O_4$ material as a precursor; leaching Mn from the $LiMn_2O_4$ material using an acid to form a synthesized solution; adding carbonaceous material to the synthesized solution; adding phosphoric acid to the synthesized solution with carbonaceous material to form $MnPO_4$ composite material; and adding Li containing compound to the $MnPO_4$ composite material to form $LiMnPO_4$ composite material.

12 Claims, 6 Drawing Sheets

Phase #1 [Bragg-R = 2.45%]: Lithiophilite

Chemical Formula = LiMnPO4

Orthorhombic: Pmnb (62), Z=4, oP? [PDF#00-033-0803]

[x] $a$ = 6.10287 (0.00265) <2> [ ] α = 90.0   (0.0   ) <2>
   [x] $b$ = 10.4603 (0.00438) <2> [ ] β = 90.0   (0.0   ) <2>
   [x] $c$ = 4.74375 (0.00223) <2> [ ] γ = 90.0   (0.0   ) <2>

Unit Cell Volume = 302.8(Å$^3$), Density = 3.4401(g/cm$^3$), Absorption(μ) = 410.0(1/cm)

[x] SF = 31.2795 (0.70381) <1> Intensity Scale Factor
   [ ] TF = 0.0    (0.0   ) <4> Overall Temperature Factor (Ctrl: All Phases)
   [ ] TS = 0.0    (0.0   ) <4> Thin Specimen Absorption Correction
   [ ] PO = 1.0    (0.0   ) <3> Preferred Orientation Correction

[x] f0 = 0.13593 (0.01862) <2> FWHM = f0 + f1 x 2θ + f2 x 2θ$^2$
   [x] f1 = 0.12464 (0.03578) <3>
   [ ] f2 = 0.0    (0.0   ) <3>

Refinement Halted (R/E=1.32), Round=3, Iter=7, P=31, R=2.45% (E=1.86%, EPS=0.5)

FIG. 3B

CHEMICAL SYNTHESIS ROUTE FOR LITHIUM ION BATTERY APPLICATIONS

CROSS-REFERENCE TO RELATED APPLICATIONS

This application is a divisional of, and claims priority to, co-pending U.S. patent application entitled "Chemical Synthesis Route for Lithium Ion Battery Applications," filed on Apr. 18, 2013, and assigned application Ser. No. 13/865,963, which is incorporated herein by reference in its entirety.

TECHNICAL FIELD

The present disclosure is generally concerned with processing techniques for materials synthesis for lithium ion batteries.

BACKGROUND

Conventional $LiMnPO_4$ material is a material exhibiting low electrical conductivity. As a result, this material is restrictive or picky on the synthesis conditions and electrode preparation methods for lithium ion battery applications. Even though carbon coating has been used to improve the electrochemical property, carbon coating alone may not resolve the intrinsically low electrical conductivity nature of the $LiMnPO_4$ material. Furthermore, the carbon coating may limit the storage time of the resultant material, and the coating nature may be destroyed during the slurry making process especially when solvent is water based. Since coating is on the material surface only, the integrity of the coating is always challenged during the electrode making processes and this increases the chance of unstable (inconsistent) performance of the final battery.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of certain embodiments of the present disclosure. Moreover, in the drawings, like reference numerals designate corresponding parts throughout the several views.

FIGS. 3A-3B are diagrams illustrating results of an examination of synthesized materials using X-ray diffraction in accordance with embodiments of the present disclosure.

DETAILED DESCRIPTION

Disclosed herein are certain embodiments of a novel chemical synthesis route for lithium ion battery applications. In one such embodiment, battery active material $LiMn_2O_4$ is used as a starting precursor. Accordingly, a new synthesis route is disclosed showing how to make $LiMnPO_4$ composite materials at low temperatures using $LiMn_2O_4$ as the synthesis precursor. By doing so, a resulting material's electrical conductivity is enhanced with the presence of residual $LiMn_2O_4$. Further, with the aid of a synthesis route of phosphate material at low temperatures, it is possible to synthesize materials with dual battery active material, thus achieving the possibility in tailoring physical and electrochemical properties of the synthesized materials. In addition, embodiments of the present disclosure contemplate and allow for multiple-active-material materials systems in battery applications.

In accordance with the present disclosure, spinel structured $LiMn_2O_4$ may be used as the precursor material, in various embodiments. Consider that since the spinel structured $LiMn_2O_4$ is stable at high temperatures, it is easy to synthesize mixed oxide phosphate material using spinel structure material as the precursor. For example, the synthesis of $Li(Mn_{1/2}Fe_{1/2})PO_4$ can be achieved using $Li(Mn_{1/2}Fe_{1/2})_2O_4$ as the starting precursor.

Additionally, for various embodiments, control of phosphorous content may determine the ratio of the precursor to the resultant material. This may be useful in tailoring the electrical conductivity as well as the electrochemical capacity of the resultant material. For example, easy control of the phosphorous content in the resultant material renders flexibility in tailoring a final material's physical and electrochemical properties.

As discussed below, an embodiment of a new synthesis route is disclosed showing how to make $LiMnPO_4$ or $LiMnPO_4$—$LiMn_2O_4$ composite materials at low temperatures (e.g., less than 400° C., and can be as low as 120° C.) using $LiMn_2O_4$ as the synthesis precursor. Low temperature synthesis offers the chance in maintaining the precursor materials structure (and thus maintain electrochemically active) in the resultant material.

Figure 1:
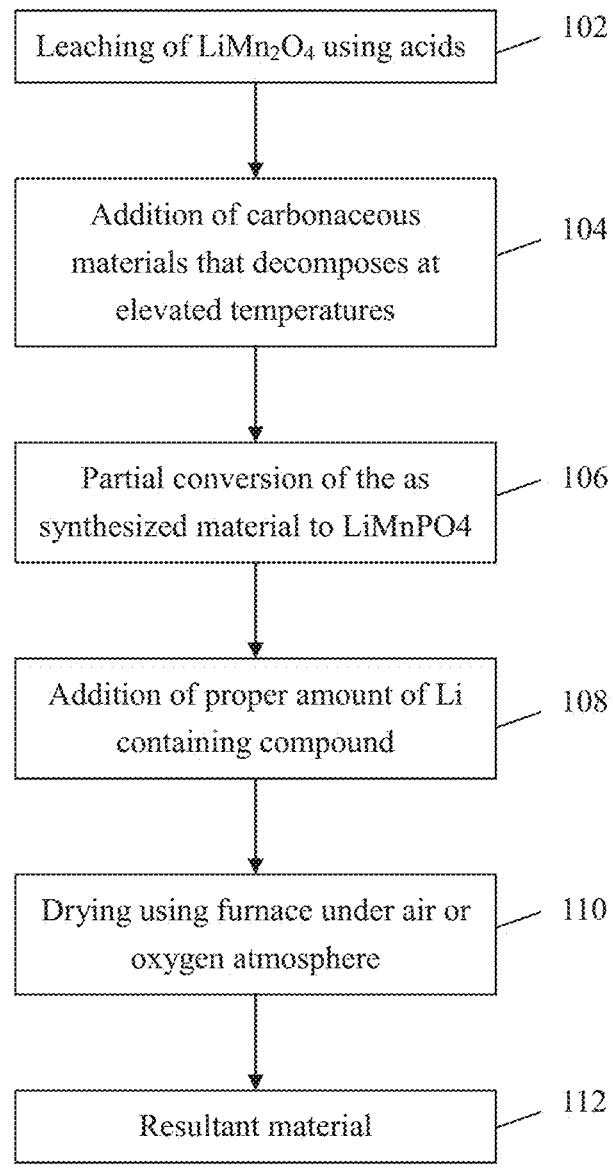
FIG. 1 is a flow chart diagram illustrating an embodiment of an exemplary process for materials synthesis for lithium ion batteries in accordance with the present disclosure.

In general, an embodiment of a process for the new materials synthesis contains several important steps as shown in FIG. 1. The process starts with the leaching of $LiMn_2O_4$ using acids, in step 102. Next, carbonaceous materials that decompose at elevated temperatures are added, in step 104. Here, elevated temperatures are meant to include temperatures which are sufficient in decomposing the carbonaceous materials thus increasing the materials conductivity.

Referring back to the figure, the synthesized material is partially converted to $LiMnPO_4$, in step 106; and a proper amount of Li containing compound is added, in step 108, as discussed further below. Then, the synthesized material is dried using a furnace under air or oxygen atmosphere, in step 110, to produce or generate the resulting material, in step 112.

Figure 2:
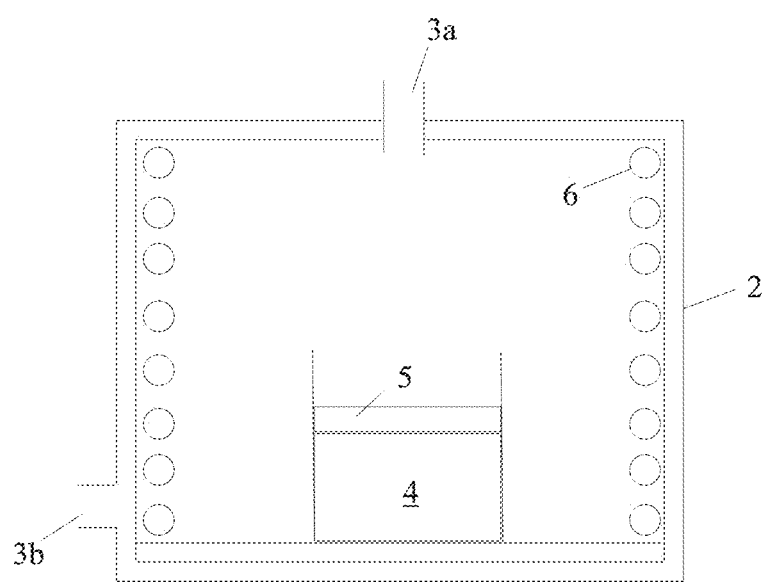
FIG. 2 is a diagram of an exemplary embodiment of a furnace and a heat treatment environment for the synthesis of materials in accordance with the present disclosure.

FIG. 2 shows the design of a furnace and a heat treatment environment for the synthesis of the materials presently disclosed. FIG. 2 shows reaction vessel 1, which is open to air in furnace 2. The furnace is open to the atmosphere at 3a and 3b so as to maintain substantially atmospheric pressure in the furnace. Flow of gases into or out of the furnace is dependent on heating and cooling cycles of the furnace and chemical reactions taking place with materials in the furnace. Air is free to enter the furnace, and air and/or products of a chemical reaction of materials 4 in the reaction vessel 1 are free to exit the furnace. Materials 4 in vessel 1 react chemically during heating steps to form cathode materials in accordance with the present disclosure. Materials 4 in vessel 1, which face air found in the furnace, are covered by a layer of a high temperature inert blanket 5, which is porous to air and escaping gases caused by the heating step. Heating coils of the furnace are indicated at 6.

The following are examples of synthesis routes in accordance with embodiments of the present disclosure.

Example 1

Synthesis of $LiMnPO_4$—$LiMn_2O_4$=1.8:0.1 in Molar Ratio (Equivalent to 95 Mol % of $LiMnPO_4$ and 5 Mol % of $LiMn_2O_4$)

The overall reaction can be simply described below as:

$1LiMn_2O_4 + 1.8H_3PO_4 + 0.9Li \rightarrow 1.8LiMnPO_4 + 0.1LiMn_2O_4 + (H \text{ and } O).$ Exemplary synthesis procedures are detailed as below:
1. Initially, dissolve oxalic acid (e.g., 22.5 g) (0.25 mole) in CMC (carboxymethyl cellulose 1 wt % solution) 40 g at 60° C.
2. Add $LiMn_2O_4$ (e.g., 181 g) (1 mole) to the solution. At this time, purplish foam evolves implying the dissolution of Mn into the solution. Keep the solution at 80° C. for two hours until reaction is completed.
3. Add proper amount of carbonaceous materials. In this exemplary case, sucrose (e.g., 67.5 g) is added into the solution.
4. Then, cool down the solution using ice bath.
5. Then, add phosphoric acid (e.g., 207 g) (1.8 mole, 85% in $H_3PO_4$ content) to the solution slowly (in two hours) in ice bath.
6. Then, warm the solution to 50° C. for two hours (at this moment, greenish powder forms).
7. Cool the solution again and add (e.g., 50 g) (1.1 mole) formic acid. Afterwards, add $Li_2CO_3$ (e.g., 33.3 g) (0.9 mole in Li content) to the solution. While adding $Li_2CO_3$ to the solution, bubbles form and the solution became a slurry.
8. After $Li_2CO_3$ addition, the slurry temperature is raised again to 50° C. At this time, foaming is observed.
9. After 2 hours foaming, the very viscous solution is dried at 120° C. for 10 hours.

Step 1 and 2 (above) are used for leaching Mn from $LiMn_2O_4$. The acid used in step 1 is not limited to oxalic acid. Formic acid, acetic acid, hydrochloric acid, nitric acid are all allowed. However, organic acids are preferred in some embodiments.

Step 3 (above) is used in carbonaceous material addition. The carbonaceous material is not limited to sucrose. Methyl cellulose (MC), Methylcarboxylmethyl cellulose (CMC), Cellulose acetate, starch, styrene butadiene rubber are all allowed in achieving the same goal (i.e. increase material's electrical conductivity after decomposition). In fact, the materials synthesis can be free from the addition of the carbonaceous material if proper amount and distribution of $LiMn_2O_4$ are present in the resultant material.

Steps 4, 5, and 6 (above) are used for $MnPO_4$ formation. These steps control the percentage of $LiMn_2O_4$ remaining or the percentage of $MnPO_4$ formation. Steps 7, 8, and 9 are used for the formation of $LiMnPO_4$ in the form of foam. Foaming can be helpful in making materials with open porosity.

Figure 3A:
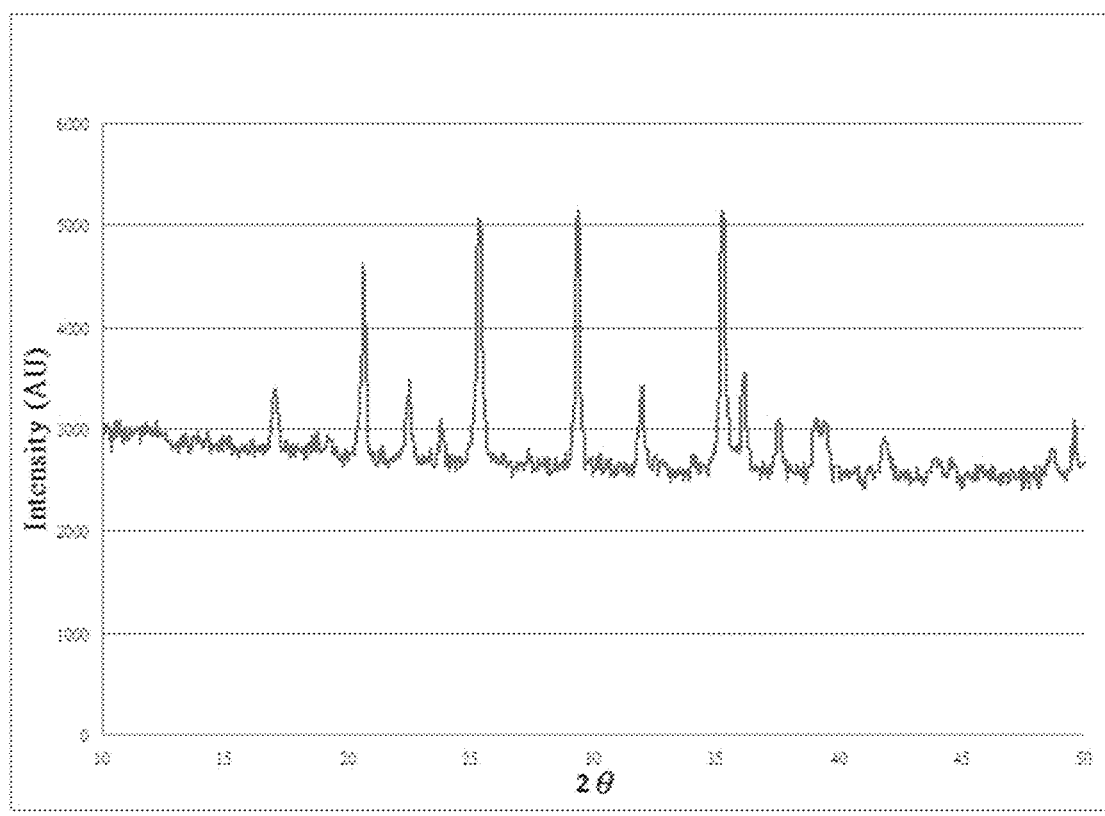

For comparative analysis, the resultant material was examined with XRD (X-ray Diffraction) and the XRD result is shown in FIGS. 3A-3B. Rietveld refinement was conducted on the XRD result using space group Pmnb(62). The lattice parameters were determined to be a=6.10287, b=10.4603, and c=4.74375 with cell volume=302.8 (Å$^3$) and Density=3.4401 g/cm$^3$. In this case, the trace phase of $LiMn_2O_4$ is not obvious in the XRD plot. The particle size and BET analyses on the precursor $LiMn_2O_4$ and the resultant material are also shown in Table I for comparisons of the evolution of physical properties exhibited by the material during the synthesis route.

TABLE I

|  | Particle size Data (um) | | | Surface Area Data (BET) |
| --- | --- | --- | --- | --- |
|  | D10 | D50 | D100 | (m$^2$/g) |
| $LiMn_2O_4$ | 2.88 | 15.97 | 71.08 | 0.6368 |
| Resultant Material† | 0.78 | 2.39 | 44.60 | 1.2556 |
| After Heat Treatment‡ | 0.86 | 2.81 | 60.03 | 2.35 |

†Resultant material was obtained after drying the sample at 120° C. for 10 hours.
‡After heat treatment refers to 260° C. for 2 hours.

From Table I, it can be seen that pulverization of the precursor material occurred during the synthesis. The particle size decreased with the increase of specific surface area. A further heat treatment of the resultant material at 260° C. for 2 hours in air shows that a moderate increase of particle size is accompanied with significant increase of specific surface area (please refer to Table 1). This result indicates that sintering of the material is not rigorous at 260° C. but the decomposition of the carbonaceous material is contributing to the significant increase of the specific surface area. It should be noticed that the decomposition at 260° C. could help material's electrical conductivity owing to the presence of the electrical conducting carbon resulted from the carbonaceous materials decomposition.

Example 2

Electrochemical Characterization of $LiMnPO_4$—$LiMn_2O_4$=1.8:0.1 in Molar Ratio (Equivalent to 95 Mol % of $LiMnPO_4$ and 5 Mol % of $LiMn_2O_4$)

For electrode preparation, 5 g of active material, 1 g of Super-P carbon black, and 0.3 g of SBR (styrene-butadiene rubber) are used in the slurry making. After coating using doctor blade, the coated electrode is dried at 110° C. for 3 hours followed by punching of the electrode. After vacuum drying again at 110° C. for overnight, the electrodes are transferred to the glove box for test cell assembly. The test cell is a three-electrode design with Li as the reference electrode. The electrode loading is 6 mg and the active material content is 81.3%. The C-rate used is around C/10 and the room temperature is around 23° C.

Figure 4:
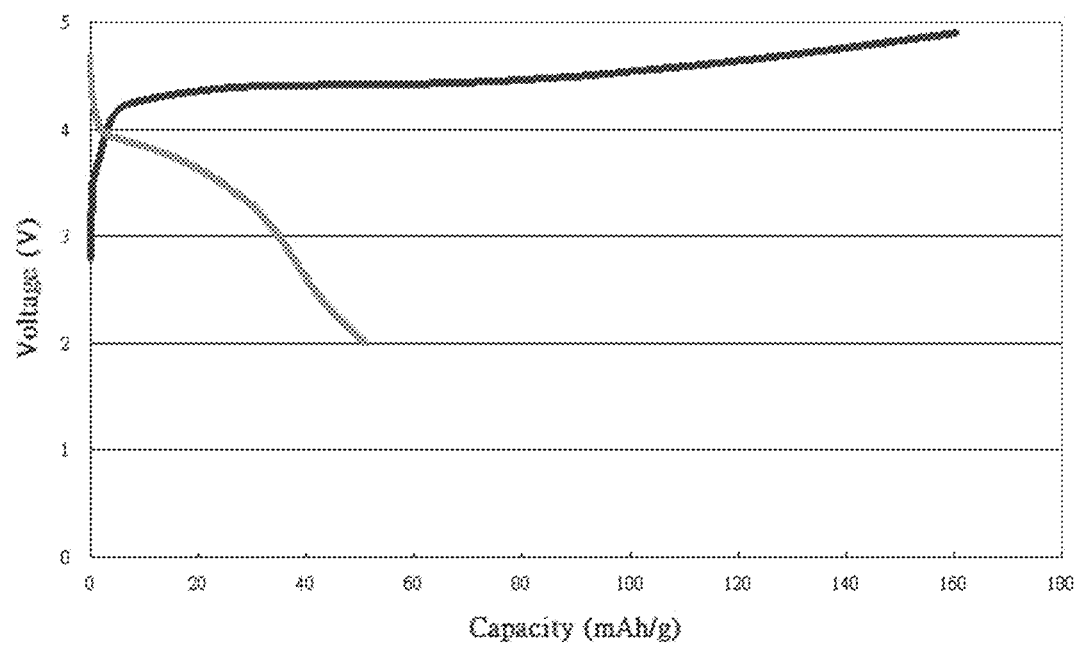
FIG. 4 is diagram of examination results for the charge capacity of synthesized materials in accordance with embodiments of the present disclosure.

A charge capacity of 160.5 mAh/g and a discharge capacity of 51 mAh/g are obtained, as shown in the examination results of FIG. 4. The corresponding Coulomb efficiency is observed to be 31.7%. Since the test cell was charged to 4.9V, more or less decomposition of the electrolyte during charging could result in the low Coulomb efficiency.

Example 3

Synthesis of LiMnPO$_4$—LiMn$_2$O$_4$=1:0.5 in Molar Ratio (Equivalent to 67 Mol % of LiMnPO$_4$ and 33 Mol % of LiMn$_2$O$_4$)

The overall reaction can be simply described below as:

1LiMn$_2$O$_4$+1H$_3$PO$_4$→1Li$_{(1-0.5x)}$MnPO$_4$+ 0.5Li$_x$Mn$_2$O$_4$, where X represents deficiency of Li. Exemplary synthesis procedures are detailed as below:

1. Initially, dissolve oxalic acid (e.g., 11.25 g) (0.125 mole) in CMC (carboxymethyl cellulose 1 wt % solution) (e.g., 40 g) at 80° C.
2. Add LiMn$_2$O$_4$ (e.g., 90.5 g) (0.5 mole) to the solution. At this time, purplish foam evolves implying the dissolution of Mn into the solution. Keep the solution at 80° C. for two hours until reaction is completed.
3. Add proper amount of carbonaceous materials. In this exemplary case, sucrose (e.g., 33.75 g) is added into the solution.
4. Then, cool down the solution using ice bath.
5. Then, add phosphoric acid (e.g., 57.65 g) (0.5 mole, 85% in H$_3$PO$_4$ content) to the solution slowly (in two hours) in ice bath.
6. Then, warm the solution to 50° C. for two hours (at this moment, greenish powder forms).
7. Wait until the solution become tacky.
8. Conduct heat treatment by sending the precursor material directly to the furnace at 380° C. for 10 hours under oxygen.

Figure 5:
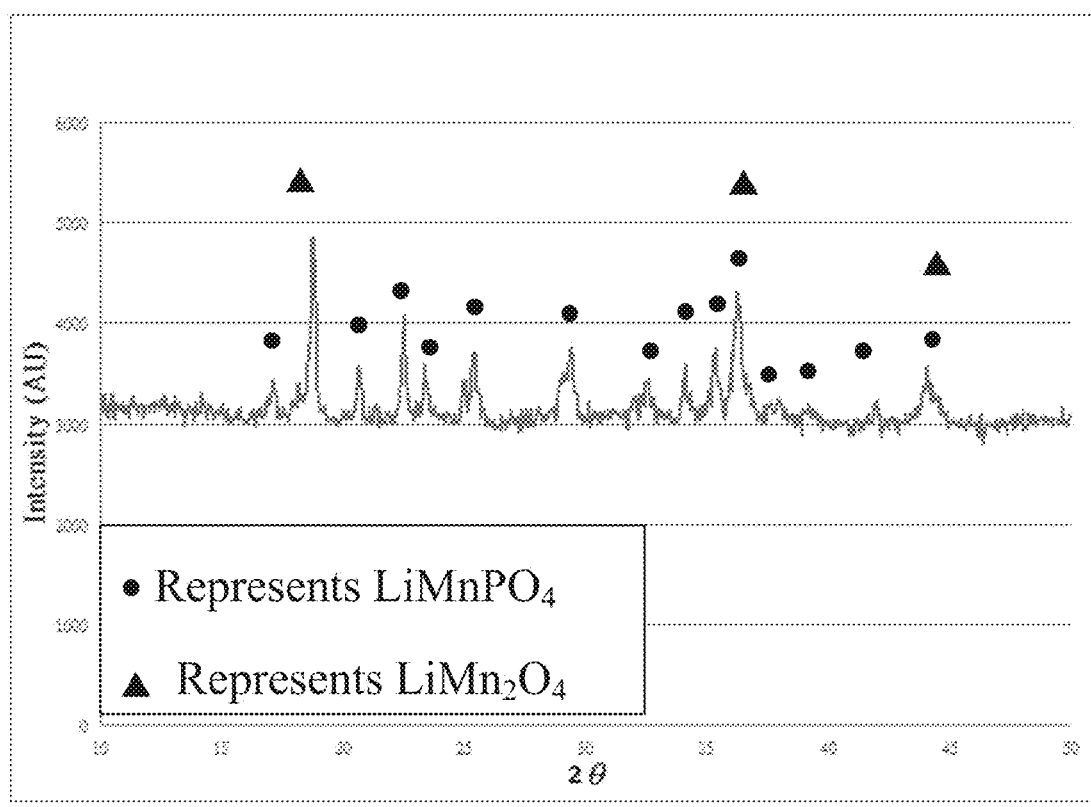
FIG. 5 is a diagram illustrating a result of an examination of synthesized materials using X-ray diffraction in accordance with embodiments of the present disclosure.

For comparative analysis, the resultant material was examined with XRD and the XRD result is shown in FIG. 5. From the XRD result, it can be identified that the resultant material consists of two phases (LiMnPO$_4$ and LiMn$_2$O$_4$ co-exist), which are present simultaneously.

Until this point, it is clear that the low temperature synthesis in accordance with embodiments of the present disclosure allows the co-existence of LiMnPO$_4$ and LiMn$_2$O$_4$. The electrochemical data reveals the potential in synthesizing LiMnPO$_4$ with the presence of LiMn$_2$O$_4$ using LiMn$_2$O$_4$ as the starting precursor. Advantageously, the presence of LiMn$_2$O$_4$ in the LiMnPO$_4$/LiMn$_2$O$_4$ composite material provides electrochemical activity as well as the electrical conducting capability in the composite material. Exemplary composite material for lithium ion battery applications in accordance with the present disclosure may be in the form of (x)LiMnPO$_4$/(1−x)LiMn$_2$O$_4$, where x ranges from 0.67 mol % to 0.99 mol %.

Any process descriptions or blocks in flow charts should be understood as representing steps in an exemplary process, and alternate implementations are included within the scope of the disclosure in which steps may be executed out of order from that shown or discussed, including substantially concurrently or in reverse order, depending on the functionality involved, as would be understood by those reasonably skilled in the art of the present disclosure.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A synthesis method comprising:
   providing LiMn$_2$O$_4$ material as a precursor;
   leaching Mn from the LiMn$_2$O$_4$ material using an acid to form a synthesized solution;
   adding carbonaceous material to the synthesized solution;
   adding phosphoric acid to the synthesized solution with carbonaceous material to form MnPO$_4$ composite material; and
   adding Li containing compound to the MnPO$_4$ composite material to form LiMnPO$_4$ composite material.

2. The method of claim 1, wherein the acid comprises an organic acid.

3. The method of claim 1, wherein the acid is one of oxalic acid, formic acid, acetic acid, hydrochloric acid, or nitric acid.

4. The method of claim 1, wherein the carbonaceous material comprises one of sucrose, methyl cellulose, methylcarboxylmethyl cellulose (CMC), cellulose acetate, starch, or styrene butadiene rubber.

5. The method of claim 1, further comprising:
   after adding the carbonaceous material, cooling down the synthesized material with carbonaceous material, wherein the phosphoric acid is added while the synthesized material is still cooled.

6. The method of claim 1, wherein formic acid is added to the MnPO$_4$ composite material before the Li containing compound is added.

7. The method of claim 1, further comprising:
   after adding the Li containing compound, heating the LiMnPO$_4$ composite material to produce foaming.

8. The method of claim 1, further comprising:
   after adding the Li containing compound, drying the LiMnPO$_4$ composite material using a furnace under air or oxygen atmosphere.

9. The method of claim 8, wherein a temperature of the furnace does not exceed 200° C. during a drying time of 10 hours.

10. The method of claim 8, wherein a temperature of the furnace does not exceed 160° C. during a drying time of 10 hours.

11. The method of claim 10, further comprising:
    after drying the LiMnPO$_4$ composite material, further heating the synthesized material at or above 260° C. for 2 hours to aid in decomposition of the carbonaceous material.

12. The method of claim 1, further comprising:
    after adding Li containing compound to the MnPO$_4$ composite material to form LiMnPO$_4$ composite material, further heating the synthesized material to a temperature below 400° C.

* * * * *